(12) United States Patent
Tada (10) Patent No.: US 12,536,770 B2
(45) Date of Patent: Jan. 27, 2026

(54) COLOR CORRECTION DATA GENERATING APPARATUS CAPABLE OF PERFORMING COLOR MATCHING THAT DOES NOT DEPEND ON CHANGES IN PHOTOGRAPHING POSITION OF CAMERA AND COLOR TONE OF LIGHT SOURCE, CONTROL METHOD FOR COLOR CORRECTION DATA GENERATING APPARATUS, AND STORAGE MEDIUM

(71) Applicant: CANON KABUSHIKI KAISHA, Tokyo (JP)

(72) Inventor: Mitsuru Tada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 17/985,211

(22) Filed: Nov. 11, 2022

(65) Prior Publication Data
US 2023/0177665 A1    Jun. 8, 2023

(30) Foreign Application Priority Data
Dec. 6, 2021 (JP) .................. 2021-197835

(51) Int. Cl.
*G06V 10/56* (2022.01)
*G06T 5/50* (2006.01)
(Continued)

(52) U.S. Cl.
CPC ............... *G06V 10/56* (2022.01); *G06T 5/50* (2013.01); *G06T 7/90* (2017.01); *G06V 10/60* (2022.01);
(Continued)

(58) Field of Classification Search
CPC .... G06T 5/50; G06T 5/00; G06T 7/90; G06T 2207/10024; G06T 2207/10152;
(Continued)

(56) References Cited

U.S. PATENT DOCUMENTS

2010/0149372 A1* 6/2010 Silverstein ............. H04N 23/88
                                                                382/167
2012/0155753 A1* 6/2012 Masato ................... H04N 23/88
                                                                382/162

(Continued)

FOREIGN PATENT DOCUMENTS

JP    2000-311243 A    11/2000
JP    2019-144899 A    8/2019
(Continued)

*Primary Examiner* — Oneal R Mistry
*Assistant Examiner* — Justin Philip Cascais
(74) *Attorney, Agent, or Firm* — Cowan, Liebowitz & Latman, P.C.

(57) ABSTRACT

A color correction data generating apparatus capable of performing color matching not depending on changes in the photographing position of the camera and the color tone of the light source is provided. The color correction data generating apparatus, which obtains a plurality of images obtained by photographing a predetermined subject with a plurality of image pickup apparatuses, includes at least one processor and/or circuit configured to function as following units, an output unit inputting an image of a predetermined subject region included in the obtained image into a learned model that machine learning has been already performed, and outputting an inferred image obtained by inferring the image of the predetermined subject region included in an image obtained when photographing the predetermined subject under a prescribed photographing condition, and a generating unit generating color correction data that matches color characteristics of a plurality of inferred images outputted by the output unit.

16 Claims, 6 Drawing Sheets

(51) Int. Cl.
　　　*G06T 7/90*　　　(2017.01)
　　　*G06V 10/60*　　(2022.01)
　　　*H04N 9/64*　　　(2023.01)

(52) U.S. Cl.
　　　CPC ..... *H04N 9/64* (2013.01); *G06T 2207/10024* (2013.01); *G06T 2207/10152* (2013.01); *G06T 2207/20081* (2013.01)

(58) Field of Classification Search
　　　CPC ............ G06T 2207/20081; G06T 5/92; G06T 2207/30204; G06V 10/56; G06V 10/60; G06V 10/82; G06V 20/00; H04N 9/64; H04N 23/88
　　　See application file for complete search history.

(56) References Cited

U.S. PATENT DOCUMENTS

| 2022/0076031 A1* | 3/2022 | Mccoy | B60W 30/08 |
| 2023/0043536 A1* | 2/2023 | Herman | G06T 5/70 |
| 2023/0050945 A1* | 2/2023 | Nakaue | G06T 7/0012 |

FOREIGN PATENT DOCUMENTS

| WO | WO-2021204202 A1 * | 10/2021 | ............ H04N 23/88 |
| WO | WO-2022151813 A1 * | 7/2022 | ............ H04N 23/57 |

* cited by examiner

COLOR CORRECTION DATA GENERATING APPARATUS CAPABLE OF PERFORMING COLOR MATCHING THAT DOES NOT DEPEND ON CHANGES IN PHOTOGRAPHING POSITION OF CAMERA AND COLOR TONE OF LIGHT SOURCE, CONTROL METHOD FOR COLOR CORRECTION DATA GENERATING APPARATUS, AND STORAGE MEDIUM

BACKGROUND OF THE INVENTION

Field of the Invention

The present invention relates to a color correction data generating apparatus, a control method for the color correction data generating apparatus, and a storage medium.

Description of the Related Art

In the case of photographing the same subject by a plurality of cameras, before performing actual photographing, color matching that matches color characteristics of images photographed by respective cameras is performed. In the color matching, a light source for color matching and a chart for color matching are prepared, the chart for color matching illuminated by the light source for color matching is photographed by a plurality of cameras arranged in front of the chart for color matching, and a color correction lookup table (hereinafter, referred to as "LUT") is generated based on images obtained by photographing by the plurality of cameras. However, at the actual photographing site, sometimes a camera and a light source will be placed in locations different from that during the color matching, and in addition, sometimes photographing will be performed by using a light source different from the light source for color matching. In this way, when a situation where the color tone and brightness of the light source that illuminates an object to be photographed (a subject) during the color matching are different from the color tone and brightness of the light source that illuminates the object to be photographed (the subject) during the actual photographing occurs, even in the case that a color correction LUT generated in advance is used, deviations occur in the color characteristics of the images photographed by the respective cameras. In response to this issue, a technique, which uses a learning model trained (learned) by inputting surrounding images photographed and lighting conditions including the position and intensity of the light source to generate a pseudo photographed image when the lighting conditions are changed, has been proposed (for example, see Japanese Laid-Open Patent Publication (kokai) No. 2019-144899). Further, a technique, which uses white balance information at the time of photographing to train a sensor model, infers a photographed image by a sensor before image processing from a photographed image obtained by a camera, and reproduces colors with fidelity, has been proposed (for example, see Japanese Laid-Open Patent Publication (kokai) No. 2000-311243).

However, the technique disclosed in Japanese Laid-Open Patent Publication (kokai) No. 2019-144899 uses a learning model, in which the brightness of the light source is changed as the lighting condition. For this reason, it is not possible to estimate a pseudo photographed image when the color tone of the light source has changed since the time of color matching. Further, the technique disclosed in Japanese Laid-Open Patent Publication (kokai) No. 2000-311243 uses a learning model that infers camera sensor characteristics based on images photographed with a typical light source and the white balance information at that time. For this reason, it is not possible to estimate a pseudo photographed image that takes account of a color change due to a change in the photographing position of the camera since the time of color matching. As described above, conventionally, when the photographing position of the camera or the color tone of the light source has changed since the time of color matching, the deviations will occur in the color characteristics of the images photographed by the respective cameras.

SUMMARY OF THE INVENTION

The present invention provides a color correction data generating apparatus capable of performing color matching that does not depend on changes in the photographing position of the camera and the color tone of the light source, a control method for the color correction data generating apparatus, and a storage medium.

Accordingly, the present invention provides a color correction data generating apparatus that obtains a plurality of images obtained by photographing a predetermined subject with a plurality of image pickup apparatuses, comprising at least one processor and/or circuit configured to function as following units, an output unit configured to input an image of a predetermined subject region included in the obtained image into a learned model that machine learning has been already performed, and output an inferred image, which is obtained by inferring the image of the predetermined subject region included in an image obtained when photographing the predetermined subject under a prescribed photographing condition, and a generating unit configured to generate color correction data that matches color characteristics of a plurality of inferred images outputted by the output unit.

According to the present invention, it is possible to perform the color matching that does not depend on the changes in the photographing position of the camera and the color tone of the light source.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
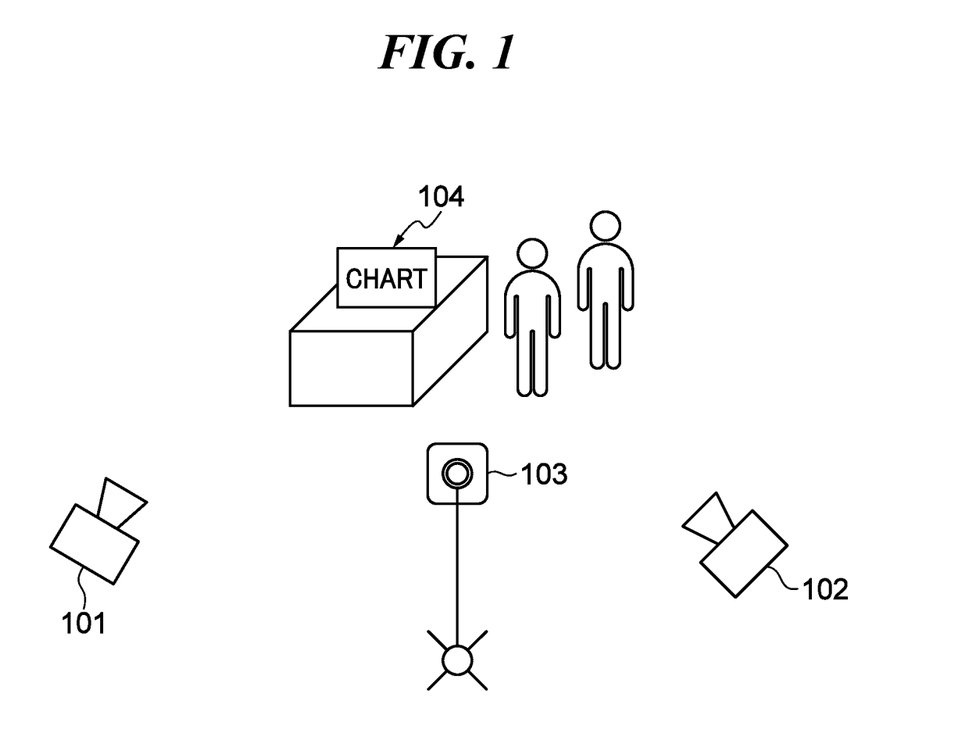
FIG. 1 is a diagram that shows an example of a photographing environment for photographing an unknown image in a first embodiment of the present invention.

First, a color correction data generating apparatus according to a first embodiment of the present invention and a control method therefor will be described. A color correction data generating apparatus according to the embodiment of the present invention is an apparatus that generates color correction data that matches color characteristics of a plurality of images obtained from different image pickup apparatuses. In the first embodiment, as one example, a configuration, which generates color correction data that corrects color characteristics of images obtained from an image pickup apparatus 101 and an image pickup apparatus 102 that are shown in FIG. 1 so as to bring them closer to each other, will be described. The image pickup apparatus 101 and the image pickup apparatus 102 respectively photograph a chart 104 illuminated by a light source 103 from different locations as shown in FIG. 1, and transmit images obtained by photographing to the color correction data generating apparatus. The chart 104 is, for example, a Macbeth chart in which a plurality of squares with different colors are arranged.

Figure 2:
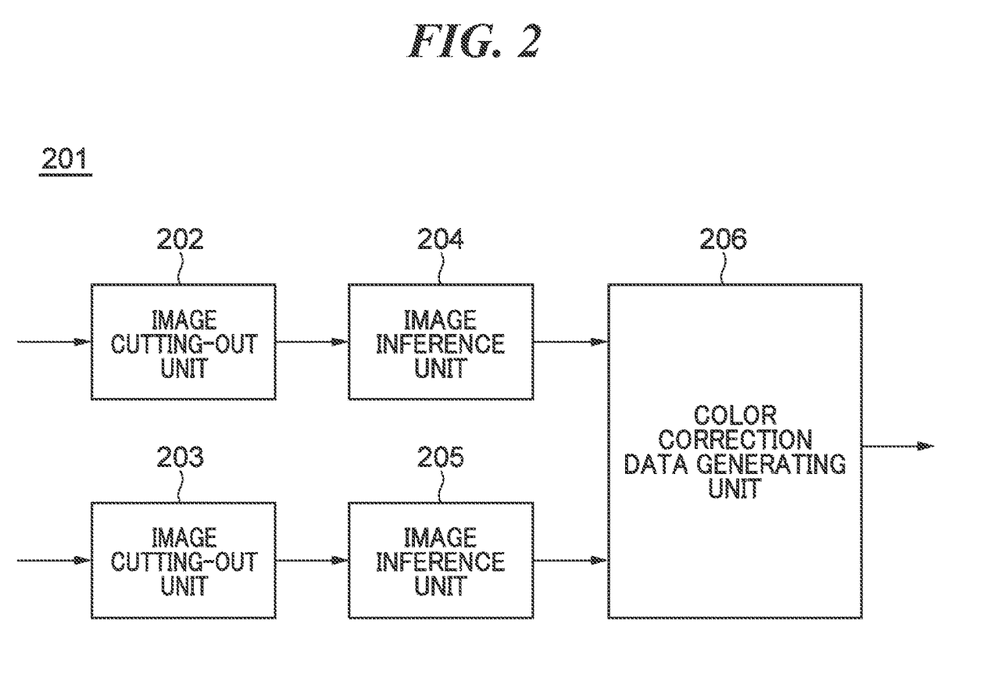
FIG. 2 is a block diagram that schematically shows a configuration of a color correction data generating apparatus according to the first embodiment of the present invention.

FIG. 2 is a block diagram that schematically shows a configuration of a color correction data generating apparatus 201 according to the first embodiment of the present invention. As shown in FIG. 2, the color correction data generating apparatus 201 includes two image cutting-out units (an image cutting-out unit 202 and an image cutting-out unit 203), two image inference units (an image inference unit 204 and an image inference unit 205) functioning as output units, and a color correction data generating unit 206.

The image cutting-out unit 202 cuts out a region to be used for color matching from an input image that is an image obtained from the image pickup apparatus 101. For example, the image cutting-out unit 202 cuts out a region in which the chart 104 is photographed (hereinafter, referred to as "a chart region") from the input image, and outputs the image of the chart region to the image inference unit 204 as a cutting-out image. It should be noted that as a method for cutting out the chart region, the image cutting-out unit 202 recognizes the chart region by using artificial intelligence (AI) or the like, and cuts out the chart region from the input image. Alternatively, a user using the color correction data generating apparatus 201 may designate a chart region in the input image, and the image cutting-out unit 202 may cut out the chart region designated by the user from the input image.

The image cutting-out unit 203 cuts out a region to be used for the color matching (a chart region) from an input image that is an image obtained from the image pickup apparatus 102 by using the same cutting-out method as the image cutting-out unit 202, and outputs the image of the chart region to the image inference unit 205 as a cutting-out image.

The image inference unit 204 inputs the unknown cutting-out image obtained from the image cutting-out unit 202 into a learned model (a trained model), and outputs an inferred image, which is obtained by inferring the image of the chart region included in an image obtained when photographed under a prescribed photographing condition described later, to the color correction data generating unit 206. The learned model (the trained model) is a model obtained by performing arbitrary machine learning. The learned model is, for example, a learned neural network whose parameters have been adjusted by error back propagation method or the like. It should be noted that the learned model may be a model other than the learned neural network. The image inference unit 205 inputs the unknown cutting-out image obtained from the image cutting-out unit 203 into the learned model, and outputs an inferred image, which is obtained by inferring the image of the chart region included in an image obtained when photographed under the above prescribed photographing condition, to the color correction data generating unit 206.

The color correction data generating unit 206, which functions as a generating unit, generates color correction data that corrects color characteristics of a plurality of the obtained inferred images so as to bring them closer to each other. For example, the color correction data, which makes the color tone of each color in the chart region of the inferred image corresponding to the photographed image of the image pickup apparatus 102 match the color tone of the corresponding color in the inferred image corresponding to the photographed image of the image pickup apparatus 101, is generated. The color correction data is 3D LUT data. The 3D LUT data is correction LUT data that converts RGB signal values of the obtained image into corrected RGB signal values. In general, since it is difficult to generate correction value table data (the correction LUT data) corresponding to all input signals, the correction LUT data is generated by dividing a combination of the input signals by a gradation width with a certain range.

For example, in the case that the input signals are 8-bit data and the correction LUT data is generated by dividing the gradation width from 0 to 255 into 15 steps, the number of the correction LUT data is 4913 (=17³). In this case, the correction of image data included in the divided range is to generate the color correction data by using tetrahedral interpolation or the like. Moreover, although the color correction data is the 3D LUT data in the first embodiment, the color correction data is not limited to the 3D LUT data. For example, in the case of performing the color correction by using a one-dimensional LUT, the color correction data is 1D LUT data. Furthermore, although the color correction data is the LUT data that corrects the RGB signal values in the first embodiment, the color correction data is not limited to the LUT data that corrects the RGB signal values. In the case that YUV signals or YCbCr signals are used, the LUT data may be the YUV signals or the YCbCr signals.

Next, learning of a learning model in the first embodiment will be described.

Figure 3:
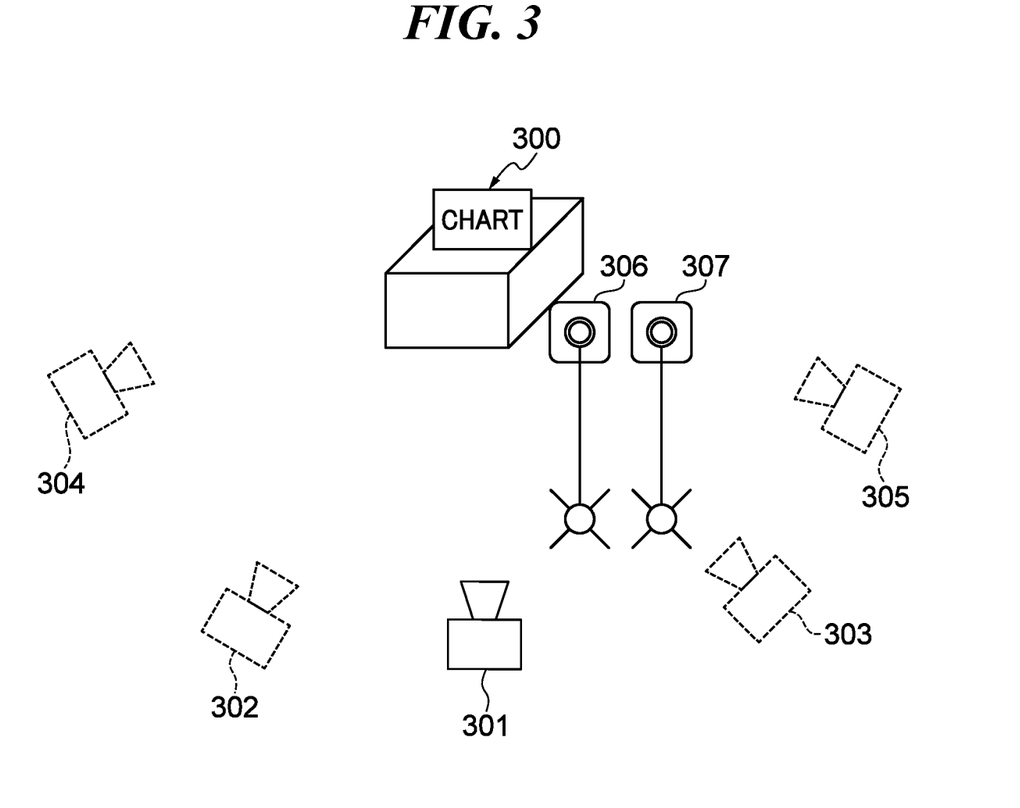
FIG. 3 is a diagram that shows an example of a photographing environment for photographing an image for learning in the first embodiment of the present invention.

FIG. 3 is a diagram that shows an example of a photographing environment for photographing an image for learning in the first embodiment of the present invention. As shown in FIG. 3, a chart 300 similar to the chart 104 is placed on a table, and an image pickup apparatus is placed in front of the chart 300. Further, a light source 306 and a light source 307 are placed so as to illuminate the chart 300.

In the first embodiment, the chart 300 is photographed from different angles by using the same image pickup apparatus. As one example, photographing is performed at five locations, that is, at a photographing position 301, a photographing position 302, a photographing position 303, a photographing position 304, and a photographing position 305. The photographing position 301 is the front of the chart 300. The photographing position 302 is a place where a horizontal angle with respect to the chart 300 on the basis of a reference axis connecting the photographing position 301 and the chart 300 is 30°. The photographing position 303 is a place where the horizontal angle with respect to the chart 300 on the basis of the above reference axis is −30°. The photographing position 304 is a place where the horizontal angle with respect to the chart 300 on the basis of the above reference axis is 60°. The photographing position 305 is a place where the horizontal angle with respect to the chart 300 on the basis of the above reference axis is −60°.

The light source 306 and the light source 307 are light sources with different spectral characteristics. In the first embodiment, the light source 306 is used as a reference light source. First, of the light source 306 and the light source 307, only the light source 306 is turned on, and the chart 300 is photographed at each of the five photographing positions described above by the same image pickup apparatus. Next, of the light source 306 and the light source 307, only the light source 307 is turned on, and similarly, the chart 300 is photographed at each of the five photographing positions described above by the same image pickup apparatus. A plurality of images obtained by photographing in this way are used as images for learning. Moreover, in the first embodiment, for ease of description, although the case of using the images photographed at different angles in a horizontal direction as the images for learning has been described, from the viewpoint of improving the learning accuracy of the learning model, it is preferable to also use images photographed at different angles in a vertical direction as the images for learning.

Figure 4:
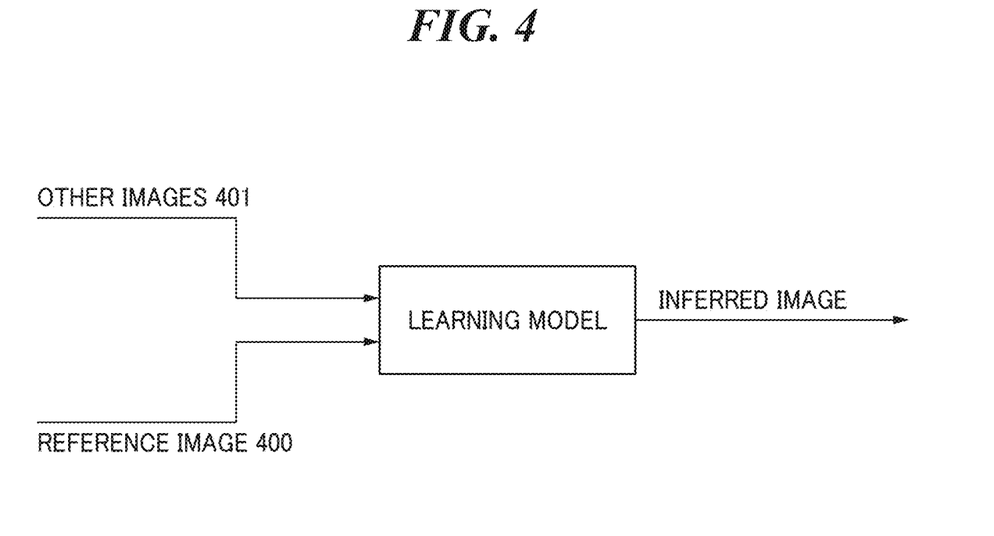
FIG. 4 is a schematic diagram of learning of a learning model in the first embodiment of the present invention.

FIG. 4 is a schematic diagram of the learning of the learning model in the first embodiment of the present invention. The learning model performs machine learning by using a reference image 400 among the plurality of images obtained by photographing in the photographing environment of FIG. 3 as training data and using other images 401 obtained by excluding the reference image 400 from the plurality of images as input. The reference image 400 is an image obtained by photographing the chart 300 illuminated by the light source 306, which is the reference light source, at the photographing position 301, which is a reference photographing position. That is, the reference image 400 is an image obtained by photographing the chart 300 illuminated by the light source 306 from the front of the chart 300. Moreover, in the first embodiment, as one example, although the reference photographing position is the photographing position 301, another photographing position (the photographing position 302, the photographing position 303, the photographing position 304, or the photographing position 305) may be the reference photographing position.

The learning model is trained (learned) so that images obtained by photographing at places other than the reference photographing position and images obtained by photographing by using light sources other than the reference light source become the images obtained by photographing the chart 300 illuminated by the reference light source at the reference photographing position. By using a learned model that has been trained (learned) in such a way, the color correction data generating apparatus 201 is able to infer an image obtained by photographing the chart illuminated by the reference light source from the reference photographing position, based on an image obtained by photographing from an angle other than the reference photographing position or an image obtained by photographing by using a light source other than the reference light source.

Next, a color correction data generating processing performed by the color correction data generating apparatus 201 will be described. The color correction data generating processing is executed when the color correction data generating apparatus 201 obtains images from the image pickup apparatus 101 and the image pickup apparatus 102, respectively. These images are images obtained by photographing the chart 104 illuminated by the light source 103 by the image pickup apparatus 101 and the image pickup apparatus 102 from places other than the front of the chart 104, respectively. Moreover, it is assumed that the light source 103 has the same spectral characteristics as the light source 307, which is not the reference light source.

In the color correction data generating processing, the image cutting-out unit 202 outputs the cutting-out image, which is obtained by cutting out the chart region from the image obtained from the image pickup apparatus 101, to the image inference unit 204. The image inference unit 204 outputs the inferred image, which is obtained by inputting the cutting-out image into the learned model described above, to the color correction data generating unit 206. This inferred image is an image that is obtained by inferring the image of the chart region included in an image obtained when photographing the chart 104 illuminated by the light source 306, which is the reference light source, from the front of the chart 104, which is the reference photographing position, by the image pickup apparatus 101.

In addition, in the color correction data generating processing, the image cutting-out unit 203 outputs the cutting-out image, which is obtained by cutting out the chart region from the image obtained from the image pickup apparatus 102, to the image inference unit 205. The image inference unit 205 outputs the inferred image, which is obtained by inputting the cutting-out image into the learned model described above, to the color correction data generating unit 206. This inferred image is an image that is obtained by inferring the image of the chart region included in an image obtained when photographing the chart 104 illuminated by the light source 306, which is the reference light source, from the front of the chart 104, which is the reference photographing position, by the image pickup apparatus 102.

The color correction data generating unit 206 generates the color correction data that corrects the inferred image obtained from the image inference unit 205 to have the same color tones as the inferred image obtained from the image inference unit 204.

According to the first embodiment described above, based on the obtained cutting-out image, the image inference unit 204 infers the image of the chart region included in the image obtained when photographing the chart 104 illuminated by the reference light source from the reference photographing position by the image pickup apparatus 101. In addition, based on the obtained cutting-out image, the image inference unit 205 infers the image of the chart region included in the image obtained when photographing the chart 104 illuminated by the reference light source from the reference photographing position by the image pickup apparatus 102. In this way, even in the case that the chart 104 is photographed from different angles by the image pickup apparatus 101 and the image pickup apparatus 102, respectively, and even in the case of photographing the chart 104 illuminated by a different light source, it becomes possible to infer the image of the chart region included in the image obtained when photographing the chart 104 illuminated by the reference light source from the reference photographing position. Furthermore, the color correction data generating unit 206 generates the color correction data that corrects the inferred image obtained from the image inference unit 205 (that is, the inferred image corresponding to the photographed image of the image pickup apparatus 102) to have the same color tones as the inferred image obtained from the image inference unit 204 (that is, the inferred image corresponding to the photographed image of the image pickup apparatus 101). In this way, it becomes possible to generate the color correction data that corrects so that the inferred images, which are obtained by inferring the images of the chart regions included in the images obtained when photographed at the same photographing position by using the same light source, have the same color tones. As a result, it is possible to perform the color matching that does not depend on the changes in the photographing position of the image pickup apparatus and the color tone of the light source.

In the first embodiment described above, the learned model is obtained by performing the machine learning by using the image for learning obtained by photographing the chart 300 illuminated by the reference light source from the reference photographing position as the training data and using the images for learning obtained by photographing the chart 300 illuminated by the reference light source from angles different from the reference photographing position as the input. As a result, it is possible to infer the image obtained by photographing the chart illuminated by the reference light source from the reference photographing position, based on the image obtained by photographing from the angle other than the reference photographing position.

In the first embodiment described above, the learned model is obtained by performing the machine learning by using the images for learning obtained by photographing the chart 300 illuminated by other light sources different from the reference light source as the input. As a result, it is possible to infer the image obtained by photographing the chart illuminated by the reference light source from the reference photographing position, based on the image obtained by photographing by using the light source other than the reference light source.

Moreover, in the first embodiment described above, the learning model may be further learned (trained) by using photographing setting information used when photographing the image for learning as the input. The photographing setting information is, for example, gamma information (γ information), color gamut information, color temperature information, ISO sensitivity information, and an F number in camera settings. Here, the image pickup apparatus is able to perform photographing by changing photographing settings such as γ, a color gamut, a color temperature, ISO sensitivity, and the F number, and even in the case of photographing the same subject in the same environment, when the photographing settings are different, the image pickup apparatus will output images with different color tones. Therefore, from the viewpoint of improving the inference accuracy, it is preferable to let the learning model learn about the photographing setting information. In this case, the learning model is learned (trained) by using the photographing setting information used when photographing the image for learning as the input. As a result, it is possible to infer the image of the chart region included in the image obtained when photographing the chart illuminated by the reference light source from the reference photographing position, taking account of the photographing setting information. Therefore, it is possible to reduce an inference error due to differences in the photographing settings.

Furthermore, in the first embodiment described above, the learning model may be learned (trained) by using model information of the image pickup apparatus used to photograph the image for learning as the input. Here, since various manufacturers have developed image pickup apparatuses and there are various models of the image pickup apparatuses depending on various purposes, even in the case that photographing is performed with the same photographing settings such as the γ, the color gamut, and the color temperature, the color characteristics are different for each image pickup apparatus. Therefore, from the viewpoint of improving the inference accuracy, it is preferable to allow the learning model to learn about the model information of the image pickup apparatus. In this case, the learning model is learned (trained) by using the model information of the image pickup apparatus (a camera) used to photograph the image for learning as the input. As a result, it is possible to infer the image of the chart region included in the image obtained when photographing the chart illuminated by the reference light source from the reference photographing position, taking account of the model information of the camera. Therefore, it is possible to reduce an inference error due to differences in the models of the image pickup apparatuses.

In the first embodiment described above, instead of the cutting-out images, the image inference unit 204 and the image inference unit 205 may input the input image that is the image obtained from the image pickup apparatus 101 and the input image that is the image obtained from the image pickup apparatus 102 into the learned model as unknown images and perform an image inference processing. For example, when photographing a chart with the full photographing angle of view, the chart will appear in the entire input image, and it is not necessary to perform the cutting-out processing described above with respect to such an input image. In such a case, instead of the cutting-out images, the image inference unit 204 and the image inference unit 205 input the input image that is the image obtained from the image pickup apparatus 101 and the input image that is the image obtained from the image pickup apparatus 102 into the learned model as the unknown images and perform the image inference processing. As a result, it is possible to infer the image of the chart region included in the image obtained when photographing the chart illuminated by the reference light source from the reference photographing position without performing the processing (the cutting-out processing) that cuts out the chart region from the input image.

It should be noted that in the configuration in which only the image obtained by photographing the chart with the full photographing angle of view is obtained as the input image, the color correction data generating apparatus 201 may not include the image cutting-out unit 202 and the image cutting-out unit 203.

Furthermore, in the first embodiment described above, the number of combinations of the image cutting-out unit and the image inference unit may be increased according to the number of the input images inputted. For example, a reference image is determined from a plurality of obtained input images, and color correction data that corrects each input image other than the reference image so that its color tones become closer to color tones of the reference image is generated. This makes it possible to collectively generate a plurality of color correction data for bringing the color tones of each input image other than the reference image closer to the color tones of the reference image.

Furthermore, in the first embodiment described above, the learning model may be learned (trained) by using light source characteristic information of the light sources used to photograph the image for learning as the input. The light source characteristic information is information indicating the types of the light sources such as sunlight, incandescent lamps, fluorescent lamps, or light emitting diodes (LEDs), and information on the shapes of optical spectrums of the light sources. As a result, it is possible to infer the image of the chart region included in the image obtained when photographing the chart illuminated by the reference light source from the reference photographing position, taking account of the light source characteristic information. Therefore, it is possible to reduce an inference error due to differences in light source characteristics.

Furthermore, in the first embodiment described above, when photographing the image for learning, the chart 300 displayed on a display may be photographed instead of the chart 300 printed on paper. Recently, the entire wall is replaced with a display, and visual effects (VFX) photographing is being performed. In the case of using the entire wall as a display like this, it is conceivable to photograph a chart displayed on the display instead of photographing a chart printed on paper, and perform color matching between the image pickup apparatus and the display. In this case, in the first embodiment described above, since only the learning model using the combination of a coating material applied on the paper and the light source can be learned, an inference error will occur. This is because even in the case that the same color tones as the chart are displayed on the display, the color tones of the inferred image differ due to differences in the reflection and spectral characteristics of the coating material. In addition, the display has viewing angle characteristics different from the reflection of the coating material, and this point also causes an error in the inferred image. In response to this issue, in the first embodiment, when photographing the image for learning, the chart 300 displayed on the display is photographed. As a result, it is possible to allow the learning model to learn about spectral characteristics and the viewing angle characteristics of the display. Therefore, it is possible to reduce an inference error due to differences in the spectral characteristics and the viewing angle characteristics of the display.

Furthermore, by preparing a plurality of displays with different spectral characteristics and viewing angle characteristics, performing photographing changing the type of the display and the angle of the image pickup apparatus, and using these images obtained by performing the photographing changing the type of the display and the angle of the image pickup apparatus as the images for learning, it is possible to estimate the image taking account of differences in models of the displays.

In the first embodiment described above, in the case that a change in ambient light is detected based on the obtained inferred images, new color correction data may be generated by performing the processing for generating the color correction data described above. Here, in general, when photographing outdoors, since the weather changes with time, even in the case that color correction data is generated as described above, sometimes this color correction data does not become the optimum correction data due to the change in the ambient light. In response to this issue, in the first embodiment, in the case that the change in the ambient light is detected based on the obtained inferred images, new color correction data is generated by performing the processing for generating the color correction data described above. As a result, it is possible to generate color correction data corresponding to the change in the ambient light.

Next, a color correction data generating apparatus according to a second embodiment of the present invention and a control method therefor will be described. The second embodiment is basically the same as the first embodiment described above in its configurations, operations, and effects, and the second embodiment differs from the first embodiment described above in that color correction data is generated without photographing the chart 104. Therefore, descriptions of the same configurations, operations, and effects are omitted, and different configurations, operations, and effects will be described below.

Figure 5:
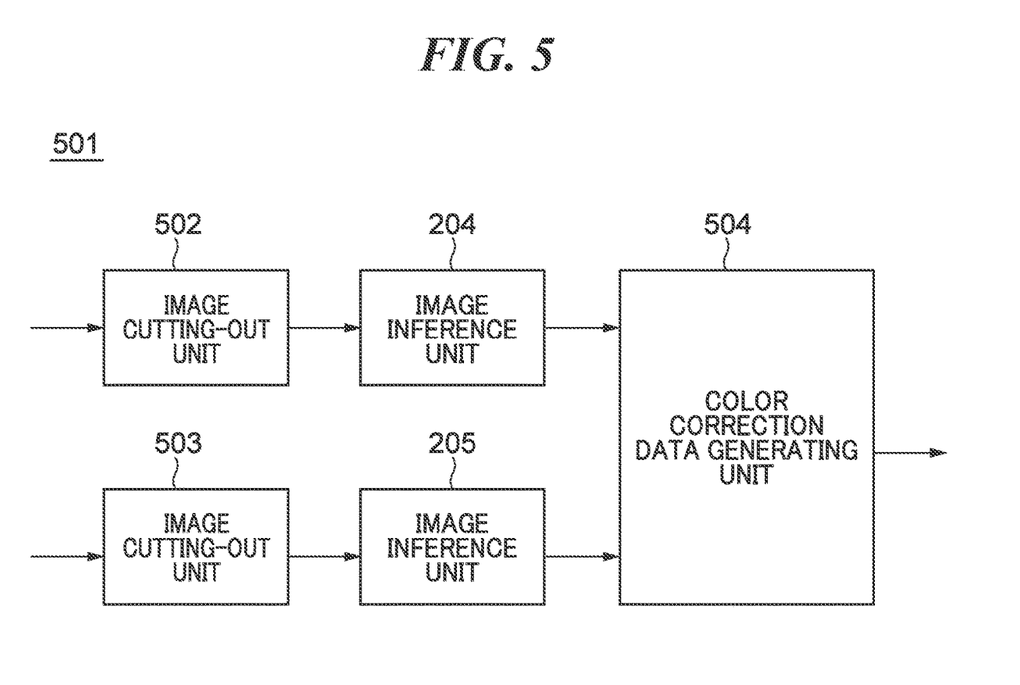
FIG. 5 is a block diagram that schematically shows a configuration of a color correction data generating apparatus according to a second embodiment of the present invention.

FIG. 5 is a block diagram that schematically shows a configuration of a color correction data generating apparatus 501 according to the second embodiment of the present invention. As shown in FIG. 5, the color correction data generating apparatus 501 includes the image inference unit 204 and the image inference unit 205 in FIG. 2 described above, and further includes an image cutting-out unit 502, an image cutting-out unit 503, and a color correction data generating unit 504.

Figure 6:
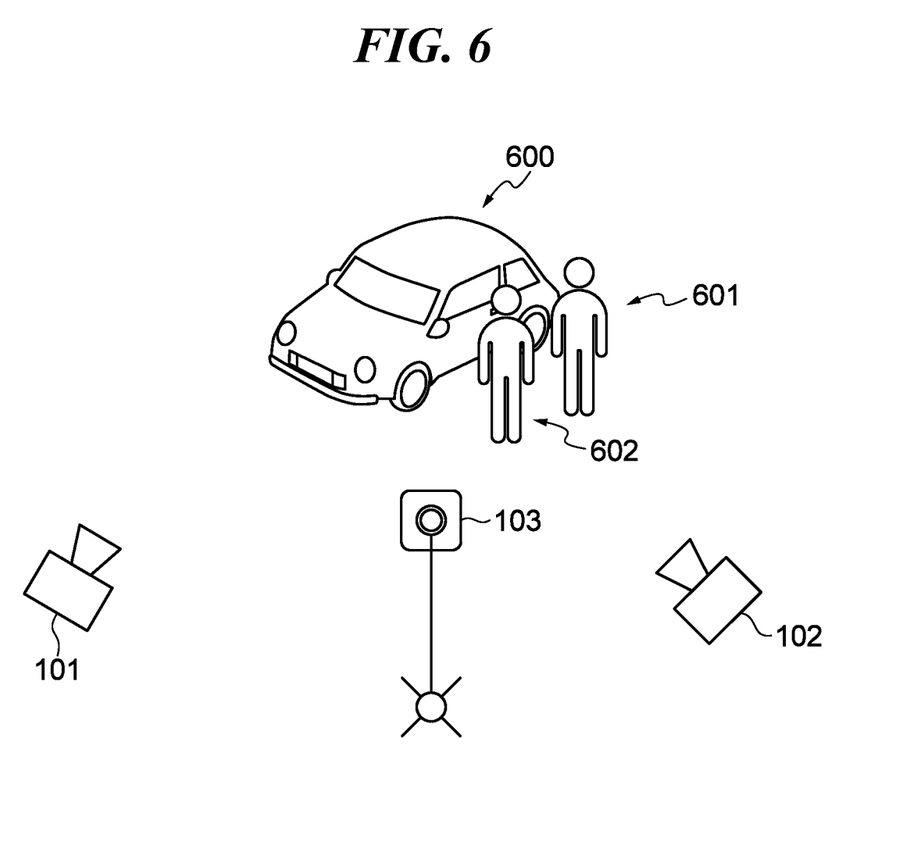
FIG. 6 is a diagram that shows an example of a photographing environment for photographing an unknown image in the second embodiment of the present invention.

FIG. 6 is a diagram that shows an example of a photographing environment for photographing an unknown image in the second embodiment of the present invention. In the second embodiment, the image pickup apparatus 101 and the image pickup apparatus 102 respectively photograph a car 600, a person 601, and a person 602 that are illuminated by the light source 103 from different locations as shown in FIG. 6, and transmit images obtained by photographing to the color correction data generating apparatus 501.

The image cutting-out unit 502 cuts out a region to be used for color matching from an input image that is an image obtained from the image pickup apparatus 101. For example, the image cutting-out unit 502 cuts out a region in which the car 600, the person 601, and the person 602 are all photographed (hereinafter, referred to as "a subject region") from the input image, and outputs the image of the subject region to the image inference unit 204 as a cutting-out image. It should be noted that as a method for cutting out the subject region, the image cutting-out unit 502 recognizes the subject region by using AI or the like, and cuts out the subject region from the input image. It should be noted that in recognizing the subject region, a region of objects of interest in the input image or a region of an object containing many colors in the input image is recognized as the subject region. The image inference unit 204 inputs the unknown cutting-out image obtained from the image cutting-out unit 502 into the learned model, and outputs an inferred image, which is obtained by inferring the image of the subject region included in an image obtained when photographing the car 600, the person 601, and the person 602 that are subjects illuminated by the reference light source from the reference photographing position, to the color correction data generating unit 504.

The image cutting-out unit 503 cuts out a region to be used for the color matching (a subject region) from an input image that is an image obtained from the image pickup apparatus 102 by using the same cutting-out method as the image cutting-out unit 502, and outputs the image of the subject region to the image inference unit 205 as a cutting-out image. The image inference unit 205 inputs the unknown cutting-out image obtained from the image cutting-out unit 503 into the learned model, and outputs an inferred image, which is obtained by inferring the image of the subject region included in an image obtained when photographing the car 600, the person 601, and the person 602 that are the subjects illuminated by the reference light source from the reference photographing position, to the color correction data generating unit 504.

The color correction data generating unit 504, which functions as a generating unit, generates color correction data that corrects color characteristics of the inferred images obtained from the image inference unit 204 and the image inference unit 205 so as to bring them closer to each other. For example, the color correction data, which makes the color tone of each color in the subject region of the inferred image corresponding to the photographed image of the image pickup apparatus 102 match the color tone of the corresponding color in the inferred image corresponding to the photographed image of the image pickup apparatus 101, is generated. When generating the color correction data, first, the color correction data generating unit 504 compares the inferred image obtained from the image inference unit 204 with the inferred image obtained from the image inference unit 205, recognizes the subjects included in both the inferred image obtained from the image inference unit 204 and the inferred image obtained from the image inference unit 205, and extracts colors of the recognized subjects. Specifically, the color correction data generating unit 504 extracts colors of the car 600, colors of the person 601, and colors of the person 602 included in both the inferred image obtained from the image inference unit 204 and the inferred image obtained from the image inference unit 205. Next, the color correction data generating unit 504 generates the color correction data that makes color tones of the extracted colors match each other. In generating the color correction data, in the case that the number of the extracted colors is smaller than a predetermined value, or in the case that there is a bias in the color tones of the extracted colors even when the number of the extracted colors is equal to or greater than the predetermined value, the color correction data that performs color correction of the extracted colors and their approximate colors is generated. In addition, in the case that the number of the extracted colors is equal to or greater than the predetermined value, or in the case that there is no bias in the color tones of the extracted colors, the color correction data that performs color correction of all target colors (the extracted colors) is generated.

In the second embodiment, the learned model, which is used by the color correction data generating apparatus 501, needs to estimate the colors of the subjects recognized by the image cutting-out unit 502 and the image cutting-out unit 503. For this reason, in the case that the learning model is learned (trained), images, which are obtained by photographing various subjects (for example, the car 600, the person 601, and the person 602) illuminated by the light source 306 in the photographing environment of FIG. 3, are used as images for learning.

In the second embodiment described above, the image cutting-out unit 502 outputs the cutting-out image, which is obtained by cutting out the image of the subject region from the input image being the image obtained by photographing the car 600, the person 601, and the person 602 that are the subjects by the image pickup apparatus 101, to the image inference unit 204. In addition, the image cutting-out unit 503 outputs the cutting-out image, which is obtained by cutting out the image of the subject region from the input image being the image obtained by photographing the car 600, the person 601, and the person 602 that are the subjects by the image pickup apparatus 102, to the image inference unit 205. The image inference unit 204 infers the image of the subject region included in the image obtained when photographing the subjects illuminated by the reference light source at the reference photographing position by the image pickup apparatus 101. In addition, the image inference unit 205 infers the image of the subject region included in the image obtained when photographing the subjects illuminated by the reference light source at the reference photographing position by the image pickup apparatus 102. The color correction data generating unit 504 generates the color correction data that corrects the color characteristics of the inferred images obtained from the image inference unit 204 and the image inference unit 205 so as to bring them closer to each other. By doing so, even in the case that subject(s) other than the chart is/are photographed, it is possible to perform the color matching that does not depend on the changes in the photographing position of the image pickup apparatus and the color tone of the light source.

Although the present invention has been described in detail based on its preferred embodiments, the present invention is not limited to these specific embodiments, and various embodiments without departing from the gist of the present invention are also included in the present invention. Some of the above-described embodiments may be combined as appropriate.

In addition, the present invention also includes the case where a software program that realizes the functions of the above-described embodiments is supplied directly from a recording medium or via wired/wireless communication to a system or apparatus having a computer capable of executing the program, and the program is executed. Therefore, in order to implement the functional processing of the present invention in a computer, the program code itself supplied and installed in the computer also realizes the present invention. In other words, the present invention also includes the computer program itself for realizing the functional processing of the present invention. In that case, as long as it has the function of the program, the form of the program, such as object codes, a program executed by an interpreter, or script data supplied to the operating system (OS), does not matter.

The recording medium for supplying the program may be, for example, a hard disk, a magnetic recording medium such as a magnetic tape, an optical/magneto-optical storage medium, or a nonvolatile semiconductor memory.

In addition, as a program supply method, a method of storing the computer program forming the present invention in a server on a computer network, and a connected client computer downloading and programming the computer program is also conceivable.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-197835, filed Dec. 6, 2021, which is hereby incorporated by reference herein in its entirety.

What is claimed is:

1. A color correction data generating apparatus that obtains a plurality of images obtained by photographing a first subject with a plurality of image pickup apparatuses, the color correction data generating apparatus comprising:
   at least one processor and/or circuit configured to function as following units;
   an output unit configured to input an image of the first subject included in the obtained image into a learned model that machine learning has been already performed, and output an inferred image, which is obtained by using the learned model to infer, from the input image, an image obtained in a case where the first subject is photographed under a first photographing condition that is different from a photographing condition of the obtained image; and
   a generating unit configured to generate color correction data that matches color characteristics of the first subject in the inferred image based on a first image photographed by a first image pickup apparatus under a second photographing condition that is different from the first photographing condition, outputted by the output unit and color characteristics of the first subject in another image based on a second image photographed by a second image pickup apparatus under a third photographing condition that is different from the second photographing condition.

2. The color correction data generating apparatus according to claim 1,
   wherein the inferred image is an image obtained by inferring, from the input image, an image of the first subject obtained in a case where an image pickup apparatus corresponding to the obtained image among the plurality of image pickup apparatuses photographs the first subject illuminated by a reference light source from a reference photographing position.

3. The color correction data generating apparatus according to claim 2,
   wherein the learned model is obtained by performing the machine learning by using an image for learning obtained by photographing the first subject illuminated by the reference light source from the reference photographing position as training data and using images for learning obtained by photographing the first subject illuminated by the reference light source from angles different from the reference photographing position as input.

4. The color correction data generating apparatus according to claim 2,
   wherein the learned model is obtained by performing the machine learning by using images for learning obtained by photographing the first subject illuminated by other light sources different from the reference light source as input.

5. The color correction data generating apparatus according to claim 3,
   wherein the learned model is obtained by further performing the machine learning by using photographing setting information used when photographing the images for learning as the input.

6. The color correction data generating apparatus according to claim 3,
   wherein the learned model is obtained by further performing the machine learning by using model information of the image pickup apparatus used to photograph the images for learning as the input.

7. The color correction data generating apparatus according to claim 1,
   wherein the first subject is a Macbeth chart printed on paper.

8. The color correction data generating apparatus according to claim 1,
   wherein the first subject is a Macbeth chart displayed on a display.

9. The color correction data generating apparatus according to claim 1,
   wherein the at least one processor and/or circuit is configured to further function as an image cutting-out unit configured to cut out the image of the first subject from the obtained image.

10. The color correction data generating apparatus according to claim 1,
    wherein the generating unit is configured to recognize subjects included in all of a plurality of inferred images outputted by the output unit, extract colors of the recognized subjects, and generate the color correction data that matches color characteristics of the extracted colors.

11. The color correction data generating apparatus according to claim 10,
    wherein in a case that the number of the extracted colors is smaller than a predetermined value, or in a case that there is a bias in color tones of the extracted colors, the generating unit is configured to generate the color correction data that performs color correction of the extracted colors and their approximate colors, and
    in a case that the number of the extracted colors is equal to or greater than the predetermined value, or in a case that there is no bias in the color tones of the extracted colors, the generating unit is configured to generate the color correction data that performs color correction of the extracted colors.

12. The color correction data generating apparatus according to claim 1,
    wherein in a case that a change in ambient light is detected based on a plurality of inferred images outputted by the output unit, the generating unit is configured to generate new color correction data.

13. The color correction data generating apparatus according to claim 1,
    wherein the output unit is configured to input, into the learned model, an image of the first subject in one of the plurality of images, obtained by photographing the first subject under the second photographing condition that is different from the first photographing condition, and output a first inferred image which is obtained by using the learned model to infer, from the input image, an image obtained in a case where the first subject is photographed under the first photographing condition, and
    the output unit is configured to input, into the learned model, an image of the first subject in anther of the plurality of images, obtained by photographing the first subject under the third photographing condition that is different from the first photographing condition and the second photographing condition, and output a second inferred image which is obtained by using the learned model to infer, from the input image, an image obtained in a case where the first subject is photographed under the first photographing condition, and the generating unit is configured to generate color correction data that matches color characteristics of the first subject in the first inferred image and color characteristics of the first subject in the second inferred image.

14. A control method for a color correction data generating apparatus that obtains a plurality of images obtained by photographing a first subject with a plurality of image pickup apparatuses, the color correction method comprising:

an output step of inputting an image of the first subject included in the obtained image into a learned model that machine learning has been already performed, and outputting an inferred image, which is obtained by using the learned model to infer, from the input image, an image obtained in a case where the first subject is photographed under a first photographing condition that is different from a photographing condition of the obtained image; and a generating step of generating color correction data that matches color characteristics of the first subject in the inferred image based on a first image photographed by a first image pickup apparatus under a second photographing condition that is different from the first photographing condition, outputted by the output unit and color characteristics of the first subject in another image based on a second image photographed by a second image pickup apparatus under a third photographing condition that is different from the second photographing condition.

15. The control method according to claim 14, wherein the output step includes inputting, into the learned model, an image of the first subject in one of the plurality of images, obtained by photographing the first subject under the second photographing condition that is different from the first photographing condition, and outputting a first inferred image which is obtained by using the learned model to infer, from the input image, an image obtained in a case where the first subject is photographed under the first photographing condition, the output step further includes inputting, into the learned model, an image of the first subject in anther of the plurality of images, obtained by photographing the first subject under the third photographing condition that is different from the first photographing condition and the second photographing condition, and outputting a second inferred image which is obtained by using the learned model to infer, from the input image, an image obtained in a case where the first subject is photographed under the first photographing condition, and the generating step includes generating color correction data that matches color characteristics of the first subject in the first inferred image and color characteristics of the first subject in the second inferred image.

16. A non-transitory computer-readable storage medium storing a program for causing a computer to execute a control method for a color correction data generating apparatus that obtains a plurality of images obtained by photographing a first subject with a plurality of image pickup apparatuses, the color correction method comprising:

an output step of inputting an image of a predetermined subject region included in the obtained image into a learned model that machine learning has been already performed, and outputting an inferred image, which is obtained by inferring the image of the predetermined subject region included in an image obtained when photographing the predetermined subject under a prescribed photographing condition; and an output step of inputting an image of the first subject included in the obtained image into a learned model that machine learning has been already performed, and outputting an inferred image, which is obtained by using the learned model to infer, from the input image, an image obtained in a case where the first subject is photographed under a first photographing condition that is different from a photographing condition of the obtained image; and a generating step of generating color correction data that matches color characteristics of the first subject in the inferred image outputted by the output step and color characteristics of the first subject in another image;

a generating step of generating color correction data that matches color characteristics of the first subject in the inferred image based on a first image photographed by a first image pickup apparatus under a second photographing condition that is different from the first photographing condition, outputted by the output unit and color characteristics of the first subject in another image based on a second image photographed by a second image pickup apparatus under a third photographing condition that is different from the second photographing condition.

* * * * *